US008701792B2

(12) United States Patent
Doring et al.

(10) Patent No.: US 8,701,792 B2

(45) Date of Patent: Apr. 22, 2014

(54) PRE-ASSEMBLABLE ARRANGEMENT

(75) Inventors: Manfred Doring, Zarrentin am Schaalsee (DE); Carsten Ziegs, Hamburg (DE)

(73) Assignee: Makita Corporation, Anjo-Shi (JP)

( * ) Notice: Subject to any disclaimer, the term of this patent is extended or adjusted under 35 U.S.C. 154(b) by 317 days.

(21) Appl. No.: 12/850,055

(22) Filed: Aug. 4, 2010

(65) Prior Publication Data

US 2011/0030519 A1 Feb. 10, 2011

(30) Foreign Application Priority Data

Aug. 5, 2009 (DE) ..................... 20 2009 010 557 U

(51) Int. Cl.
*B23B 27/12* (2006.01)

(52) U.S. Cl.
USPC .............................. 173/170; 173/171; 30/381

(58) Field of Classification Search
USPC ....... 173/173, 170, 171, DIG. 2; 30/392, 394, 30/376, 381; 123/556
See application file for complete search history.

(56) References Cited

U.S. PATENT DOCUMENTS

| | | | | |
|---|---|---|---|---|
| 3,170,005 A | | 2/1965 | Phillips | |
| 3,881,250 A | * | 5/1975 | Frederickson | 30/383 |
| 4,010,544 A | * | 3/1977 | Siman | 30/381 |
| 4,028,804 A | * | 6/1977 | Hammond | 30/382 |
| 4,592,445 A | * | 6/1986 | Sawada | 181/229 |
| 5,212,886 A | | 5/1993 | Tasaki | |
| 5,215,049 A | | 6/1993 | Wolf | |
| 5,738,064 A | * | 4/1998 | Lowe et al. | 123/198 E |
| 6,016,604 A | * | 1/2000 | Wolf et al. | 30/383 |
| 6,602,122 B1 | | 8/2003 | Rudolf et al. | |
| 7,359,628 B2 | | 4/2008 | Broghammer et al. | |
| 2008/0277130 A1 | | 11/2008 | Kurzenberger et al. | |

FOREIGN PATENT DOCUMENTS

| | | | |
|---|---|---|---|
| DE | 41 20 876 | A1 | 12/1992 |
| DE | 196 31 033 | A1 | 2/1998 |
| DE | 199 00 404 | A1 | 7/2000 |
| DE | 102 12 721 | A1 | 9/2002 |
| DE | 101 40 905 | A1 | 3/2003 |
| DE | 20 2006 008 895 | U1 | 11/2007 |
| EP | 1 426 989 | A1 | 6/2004 |
| EP | 1 598 151 | A2 | 11/2005 |
| EP | 2 062 700 | A2 | 5/2009 |

OTHER PUBLICATIONS

Search Report issued in German Patent Application No. 20 2009 010 557.1, on Oct. 8, 2010 (with translation).
May 23, 2011 European Search Report issued in European Patent Application No. 10 168 714.3 (with English-language translation).

* cited by examiner

*Primary Examiner* — Michelle Lopez
*Assistant Examiner* — Nathaniel Chukwurah
(74) *Attorney, Agent, or Firm* — Oliff PLC

(57) ABSTRACT

The invention relates to a pre-assemblable arrangement of elements, in particular a tool arrangement or hand tool arrangement, wherein the arrangement exhibits at least one intake manifold (1), a filter floor (2) and/or a carburetor (3), preferably with a carburetor wall (4), wherein a holding structure (7) is additionally provided to accommodate actuating elements (9, 10) or to form a handle (8).

17 Claims, 5 Drawing Sheets

PRE-ASSEMBLABLE ARRANGEMENT

The invention relates to a pre-assemblable arrangement of elements, in particular to a tool arrangement or a hand tool arrangement, according to the preamble to claim 1.

PRIOR ART

In the case of tool arrangements or hand tool arrangements, but also in the case of other arrangements, prior art also refers to arrangements that have a fuel-powered drive engine.

Such arrangements have an air filter and an intake manifold and a carburetor for powering the fuel-powered drive engine. Air is aspirated via the air filter, and routed from there to the carburetor by means of the intake manifold. The intake manifold is preferably made out of plastic or cast aluminum for reasons of weight. The intake manifold is here advantageously bent, since the openings on the carburetor for letting in the intake air are usually arranged in a roughly horizontal manner, so that the intake flow must in this regard be deflected. In some types of engines, the mixture is formed in the intake pipe as well, which is also referred to as intake manifold injection. This means that the air is mixed with the evaporating fuel in the intake manifold, so as to generate a combustible gas that is aspirated by the engine.

The arrangement is controlled in the usual manner by means of a manually activated unit, which encompasses a handle for holding the arrangement and an accelerator throttle for controlling the engine.

In contemporary arrangements, such as abrasive cutting-off machines, a tank handle unit is usually provided, in which the carburetor of the arrangement is immovably integrated. The process of mounting the gas-related mechanical components and carburetor immovably integrated in the tank involves a high outlay due to the numerous bonding locations, since these bonding locations must be joined, and the respective positioning process must take place very precisely, since the functionality could otherwise be disrupted or precluded.

It is here also disadvantageous that a functional inspection can only take place in the completely mounted state, and hence after the involved process of assembling the complete device.

DESCRIPTION OF THE INVENTION

Object, Solution, and Advantages

The object of the invention is to provide a pre-assemblable arrangement of elements, in particular a tool arrangement or a hand tool arrangement, which is easier to manufacture, and also permits an extensive functional check prior to complete assembly.

This is achieved with the features in claim 1, in which a pre-assemblable arrangement of elements, in particular a tool arrangement or a hand tool arrangement, is created, wherein the device encompasses at least one intake manifold, a filter floor and/or a carburetor, preferably with a carburetor wall, wherein a holding structure is further provided for accommodating actuator elements.

According to the invention, it is here advantageous if the pre-assemblable arrangement is further developed by having the arrangement encompass a filter floor or filter casing. In addition, it is advantageous for the filter casing to be roughly rectangular in cross section.

It also makes sense for the holding structure to be accommodated by the intake manifold or filter floor or the filter tongue on one of its sides.

It is especially advantageous for the holding structure to have two wall elements arranged roughly parallel to each other and spaced apart from each other.

It is further advantageous for the spaced apart wall elements to accommodate the actuator elements between them. This makes it possible to generate a handle that protects the sensitive mechanical components.

It is also advantageous for the spaced apart wall elements to accommodate the actuator or operating elements between them by holding and storing axes in openings of the wall elements. This also helps make it possible to generate a handle that protects the sensitive mechanical components, and yet still permits the smooth function of the actuator or operating elements.

It further makes sense for the axes to be arranged in openings of the wall elements, wherein a first axis is situated in the front, lower area of the wall elements.

It also makes sense for the axes to be arranged in openings of the wall elements, wherein a second axis is situated in the rear, upper area of the wall elements.

According to the invention, it is especially advantageous if the actuator elements encompass an accelerator throttle and/or a locking key.

Additional advantages according to the invention are described in the subclaims and in the following description of the figures.

BRIEF DESCRIPTION OF DRAWINGS

The invention is explained in further detail below using an exemplary embodiment based on the drawings. Shown on.

PREFERRED EMBODIMENT OF THE INVENTION

Figure 1:
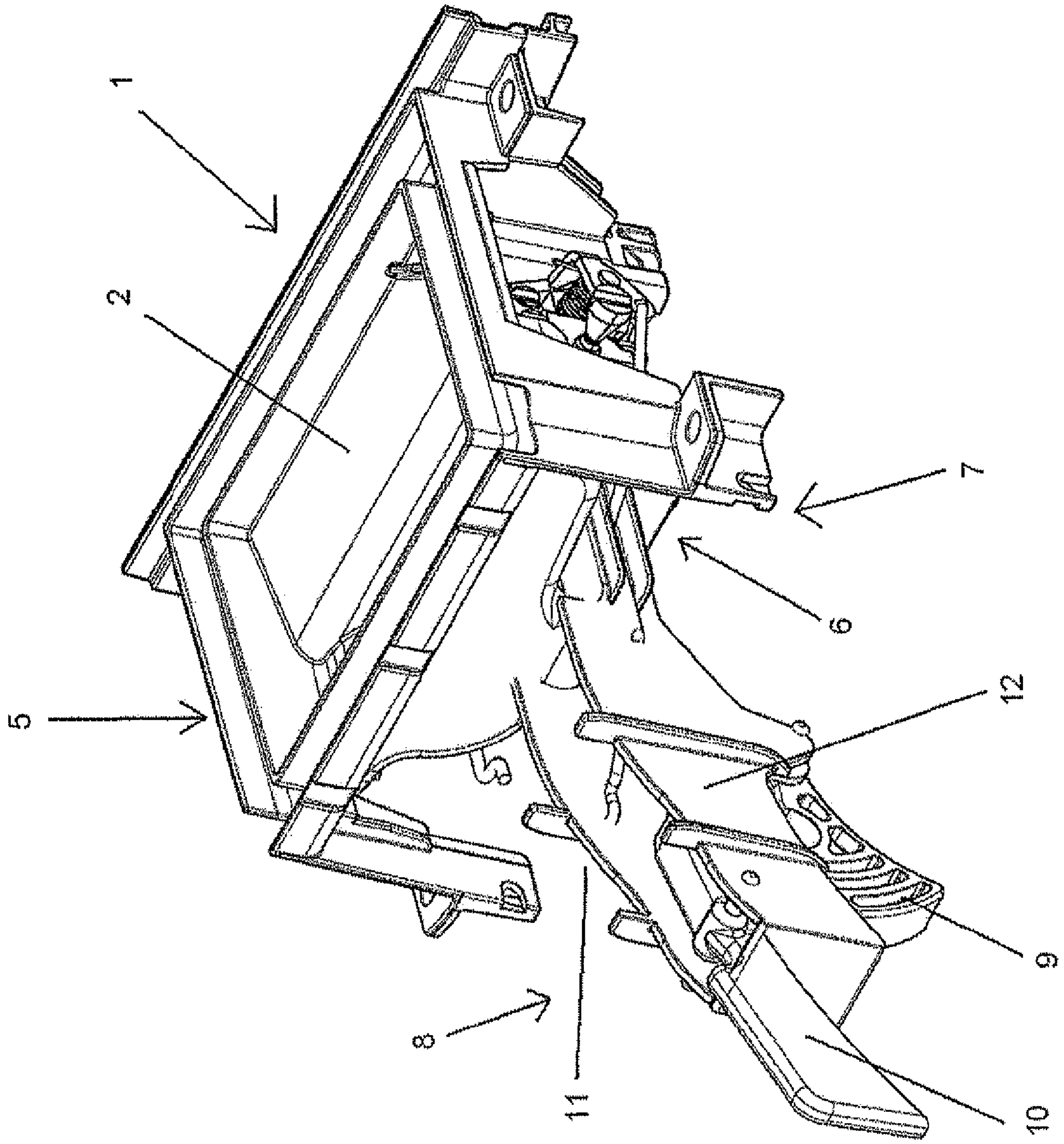
FIG. 1 is a diagrammatic view of an arrangement according to the invention.
Figure 2:
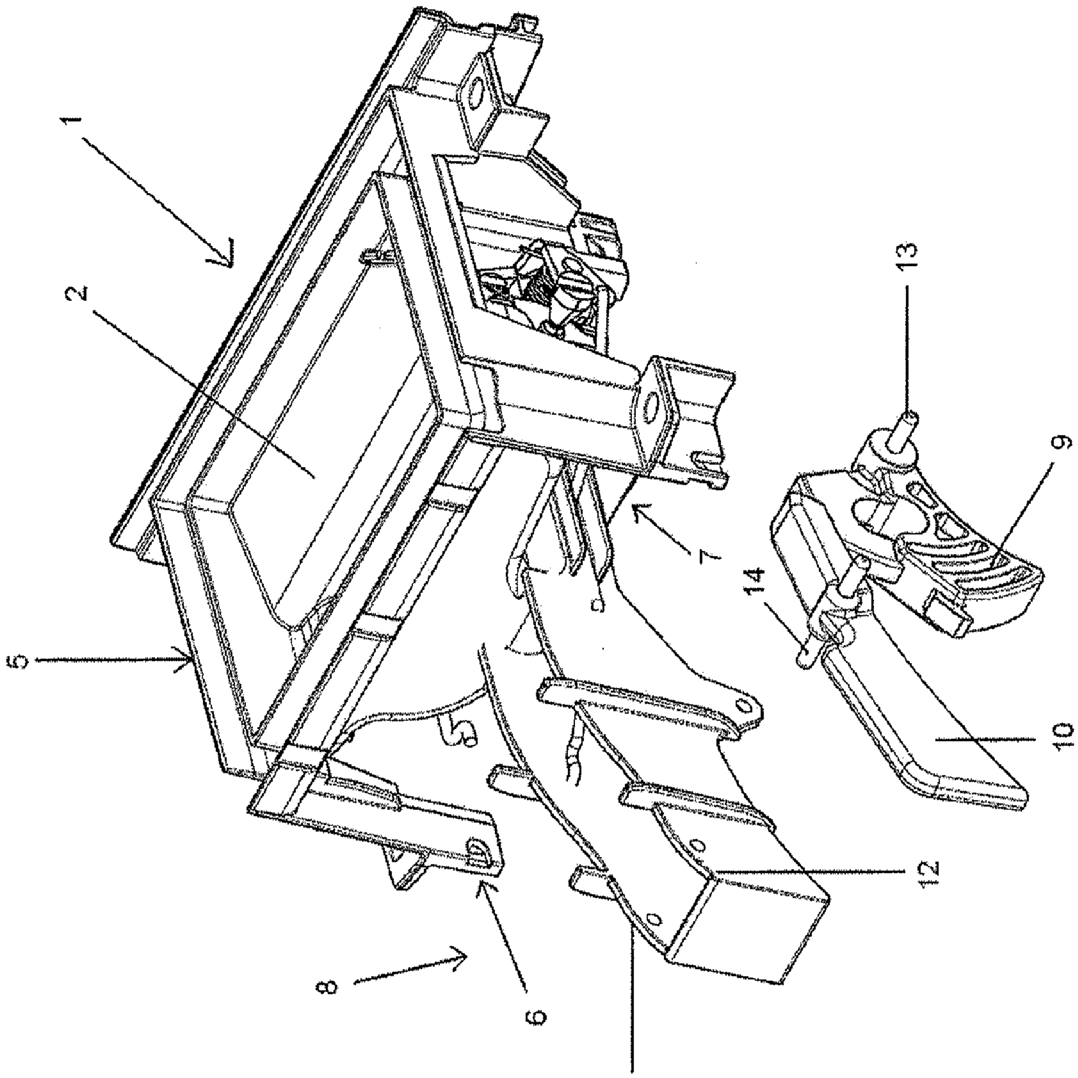
FIG. 2 is a diagrammatic view of an arrangement according to the invention with a disassembled accelerator throttle and locking key.
Figure 3:
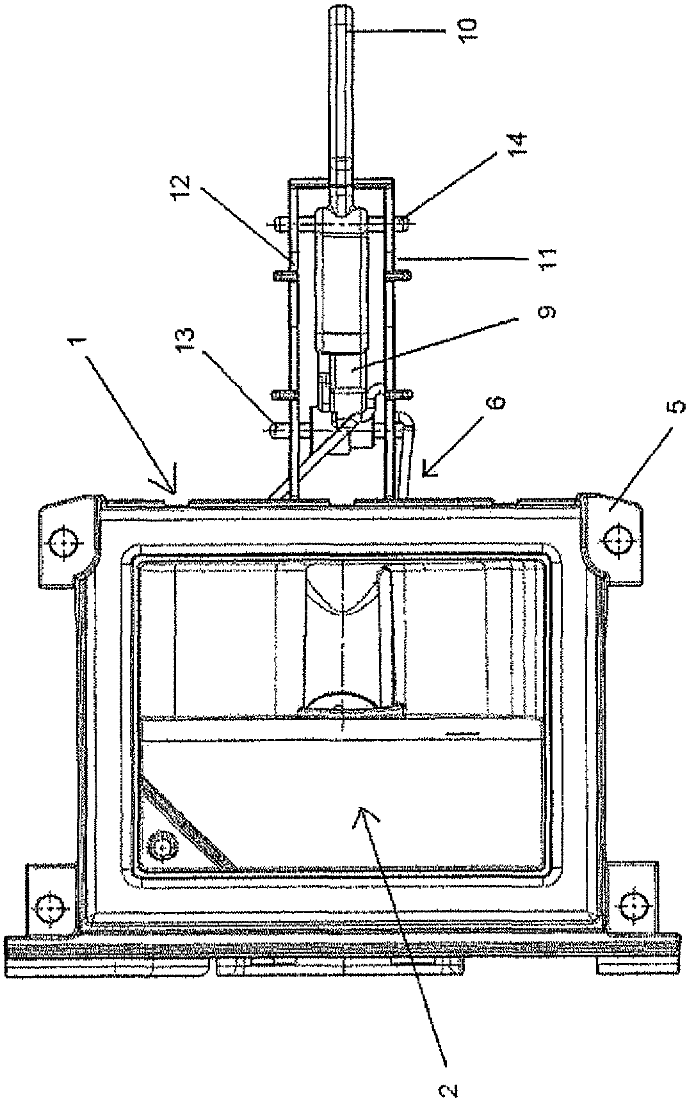
FIG. 3 is a diagrammatic top view of an arrangement according to the invention.
Figure 4:
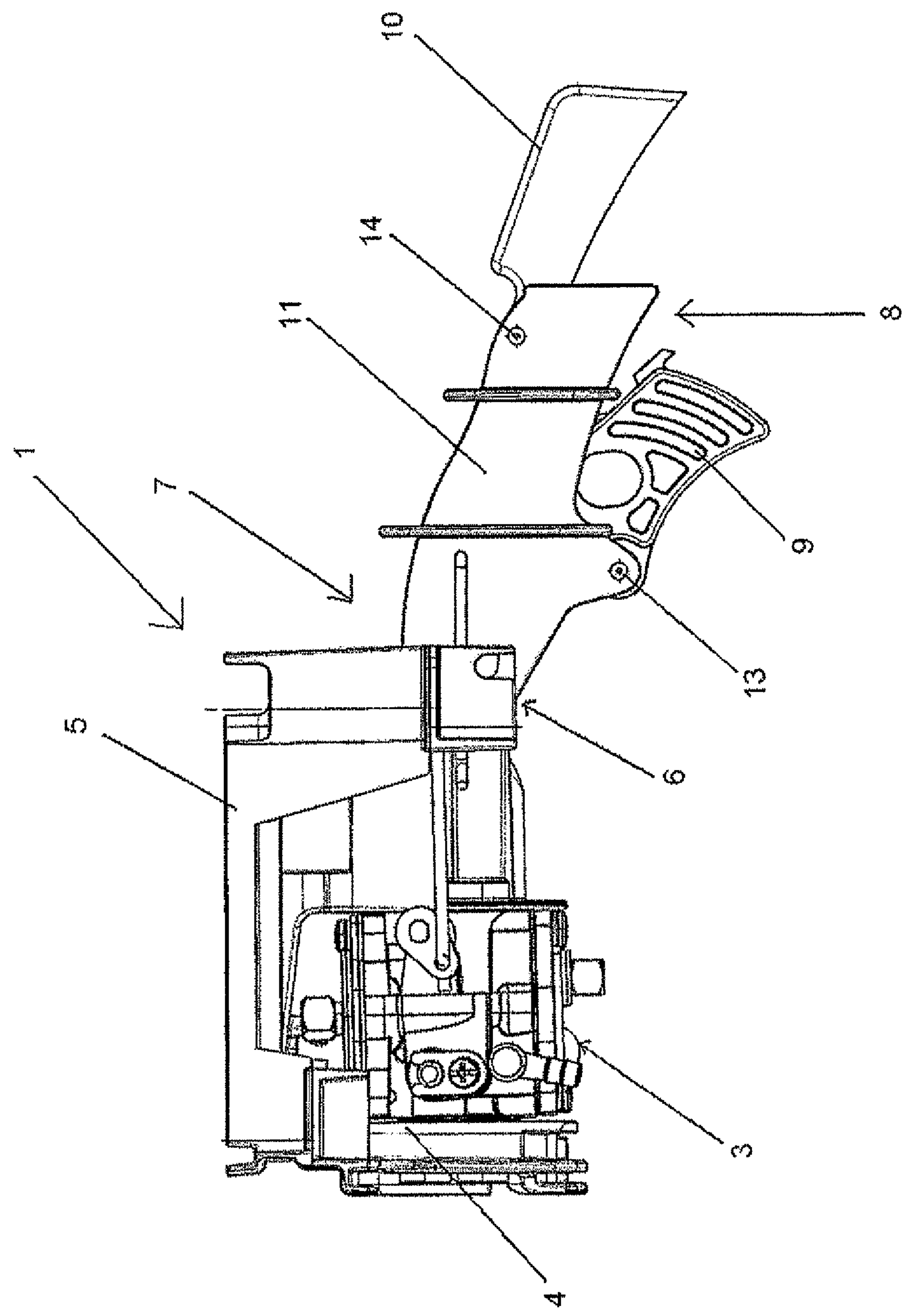
FIG. 4 is a diagrammatic side view of an arrangement according to the invention, and on FIG. 5 is a diagrammatic bottom view of an arrangement according to the invention.
Figure 5:
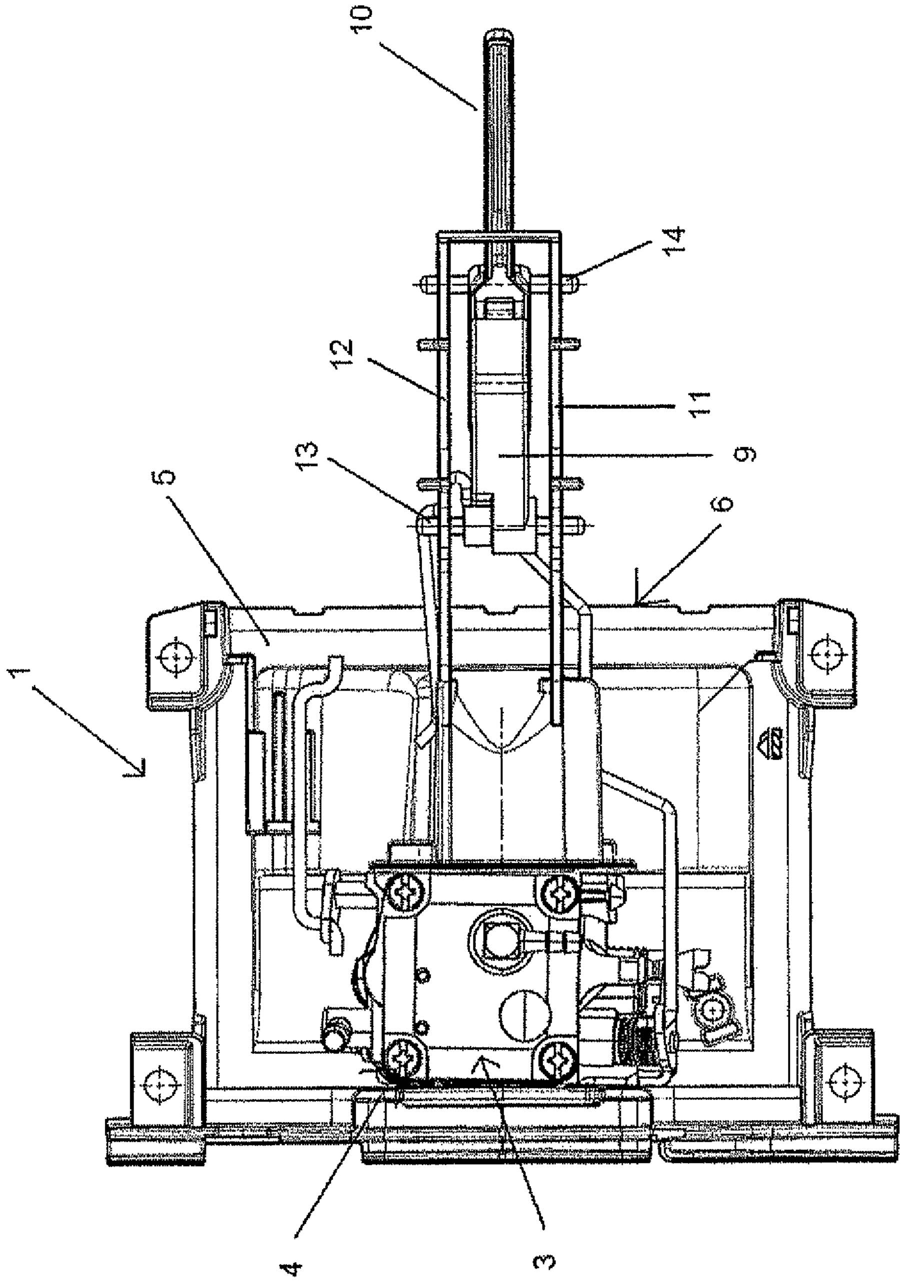

FIGS. 1 to 5 show an intake manifold 1 with a filter floor 2 and a carburetor 3 with a carburetor wall 4. The filter floor 2 is here incorporated in a roughly rectangular filter housing 5, one side 6 of which has a holding structure 7, which is used to form a handle 8 and/or accommodate actuator elements 9, 10.

The holding structure 7 here consists of two roughly opposing wall elements 11, 12, the shape of which resembles a handle when viewed from the side. The actuator elements 9, 10 are accommodated and arranged between these wall elements 11, 12 in such a way that they can each turn or pivot around an axis 13, 14.

In this case, the elements 9, 10 comprise an accelerator throttle 9 and a locking key 10 for blocking or releasing the accelerator throttle 9. The accelerator throttle is here held so that it can swivel around the axis 13, and the locking key 10 is held so that it can swivel around the axis 14.

As evident from the figures, the axis 13 is situated in the front area and on the lower area of the handle or wall elements, and the axis 14 is arranged at its end area and in its upper area.

The configuration according to the invention makes it possible to form a single component structure, which can be arranged or secured on the intake manifold, on the filter floor with the intake manifold, and/or on the carburetor wall. This component structure is able to accommodate the accelerator throttle and/or the locking key, wherein this pre-assemblable unit comprises a sub-unit to be assembled with a tank handle unit.

The unit according to the invention can be pre-assembled with the operating elements of the accelerator throttle and the locking key, and makes it possible to advantageously pre-assemble and even test the latter, so that a function check and quality control can already be performed at this stage of production.

Also advantageous is that the disassembly process can be facilitated during maintenance or service, since fewer connections have to be detached, and the latter need not be reconnected later.

REFERENCE LIST

1 Intake manifold
2 Filter floor
3 Carburetor
4 Carburetor wall
5 Filter housing
6 Side
7 Holding structure
8 Handle
9 Actuator element, accelerator throttle
10 Actuator element, locking key
11 Wall element
12 Wall element
13 Axis
14 Axis

The invention claimed is:

1. A pre-assemblable tool arrangement comprising:
a carburetor;
at least one intake manifold comprising:
a filter housing above the carburetor;
a filter floor below the filter housing and above the carburetor;
at least one actuating element; and
a holding structure that connects to a side of the intake manifold and that accommodates the actuating element, wherein:
the holding structure is in the form of a handle;
the tool arrangement is fully assembled separate from an engine; and
the tool arrangement excludes an engine or a fuel tank.

2. The pre-assemblable arrangement according to claim 1, wherein the filter housing is substantially rectangular.

3. The pre-assemblable arrangement according to claim 2, wherein the pre-assemblable arrangement is a hand tool arrangement.

4. The pre-assemblable arrangement according to claim 1, wherein the holding structure exhibits two wall elements arranged parallel to each other and spaced apart.

5. The pre-assemblable arrangement according to claim 4, wherein the spaced apart wall elements accommodate the actuating elements-element between them.

6. The pre-assemblable arrangement according to claim 5, wherein the pre-assemblable arrangement is a hand tool arrangement.

7. The pre-assemblable arrangement according to claim 4, wherein the spaced apart wall elements accommodate the actuating element between them by holding and storing axes in openings of the wall elements.

8. The pre-assemblable arrangement according to claim 7, wherein the axes are arranged in openings of the wall elements and a first axis is arranged in the front lower area of the wall elements.

9. The pre-assemblable arrangement according to claim 8, wherein the pre-assemblable arrangement is a hand tool arrangement.

10. The pre-assemblable arrangement according to claim 7, wherein the axes are arranged in openings of the wall elements and a second axis is arranged in the rear upper area of the wall elements.

11. The pre-assemblable arrangement according to claim 10, wherein the pre-assemblable arrangement is a hand tool arrangement.

12. The pre-assemblable arrangement according to claim 7, wherein the pre-assemblable arrangement is a hand tool arrangement.

13. The pre-assemblable arrangement according to claim 4, wherein the pre-assemblable arrangement is a hand tool arrangement.

14. The pre-assemblable arrangement according to claim 1, wherein the actuating element encompasses an accelerator throttle and/or a lock key.

15. The pre-assemblable arrangement according to claim 14, wherein the pre-assemblable arrangement is a hand tool arrangement.

16. The pre-assemblable arrangement according to claim 1, wherein the pre-assemblable arrangement is a hand tool arrangement.

17. A pre-assemblable tool arrangement consisting of:
a carburetor;
at least one intake manifold comprising:
a filter housing above the carburetor;
a filter floor below the filter housing and above the carburetor;
at least one actuating element; and
a holding structure that connects to a side of the intake manifold and that accommodates the actuating element, wherein:
the holding structure is in the form of a handle; and
the tool arrangement is fully assembled separate from and does not include an engine.

* * * * *